United States Patent
Sano

(10) Patent No.: US 6,995,358 B2
(45) Date of Patent: Feb. 7, 2006

(54) REFLECTIVE SENSOR, FILTER FOR REFLECTIVE SENSOR, AND METHOD OF DETECTING OBJECT USING THE SAME

(75) Inventor: Masashi Sano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 185 days.

(21) Appl. No.: 10/608,017

(22) Filed: Jun. 30, 2003

(65) Prior Publication Data

US 2004/0004197 A1    Jan. 8, 2004

(30) Foreign Application Priority Data

Jul. 5, 2002    (JP)    ............................. 2002-197453

(51) Int. Cl.
*H01J 40/14*    (2006.01)
(52) U.S. Cl. .................... 250/239; 250/559.4
(58) Field of Classification Search ................ 250/239, 250/559.4, 227.25, 227.22, 216, 551; 257/80, 257/82, 84, 433
See application file for complete search history.

(56) References Cited

U.S. PATENT DOCUMENTS 4,833,336 A * 5/1989 Kraske ...................... 250/566

5,172,003 A    12/1992 Nasu et al.

FOREIGN PATENT DOCUMENTS

| JP | 62-119983 | 6/1987 |
|---|---|---|
| JP | 4-191691 | 7/1992 |
| JP | 4-103665 | 9/1992 |
| JP | 11-049405 | 2/1999 |
| JP | 2003-207578 | 7/2003 |

\* cited by examiner

*Primary Examiner*—Que T. Le
(74) *Attorney, Agent, or Firm*—Rabin & Berdo, P.C.

(57) ABSTRACT

A reflective sensor detects the presence of a subject at a detecting position. The sensor has a sensor portion and a filter. The sensor portion includes a light-emitting element that emits light at the detecting position and a light-receiving element that receives light reflected from the subject, and generates an electrical signal corresponding to a quantity of received light. The filter is between the sensor portion and the detecting position, is made of a material that transmits light heading to the detecting position from the light-emitting element and light heading to the light-receiving element from the subject, and prevents intrusion of dust. A filter surface facing the sensor portion is tapered and has an inclined plane opposing the light-emitting element, another inclined plane opposing the light-receiving element, and a ridge portion where the inclined planes meet. The ridge portion extends between the light-emitting element and the light-receiving element.

7 Claims, 8 Drawing Sheets

FIG. 8

| FILTER SHAPE | STATE OF PAPER | ARRIVING ENERGY (E) | WHITE PAPER/ ABSENT (R1) | WHITE PAPER/ BLACK PAPER (R2) |
|---|---|---|---|---|
| (1) NON-USE | WHITE | 0.64521% | — | 9.02 |
| | BLACK | 0.07151% | | |
| | ABSENT | 0% | | |
| (2) FLAT-SHAPED | WHITE | 0.68561% | 9.77 | 5.24 |
| | BLACK | 0.13082% | | |
| | ABSENT | 0.07018% | | |
| (3) T-SHAPED | WHITE | 0.50186% | 9.37 | 5.24 |
| | BLACK | 0.09573% | | |
| | ABSENT | 0.05356% | | |
| (4) TAPERED | WHITE | 1.23540% | 19.45 | 6.66 |
| | BLACK | 0.18539% | | |
| | ABSENT | 0.06353% | | |

REFLECTIVE SENSOR, FILTER FOR REFLECTIVE SENSOR, AND METHOD OF DETECTING OBJECT USING THE SAME

BACKGROUND OF THE INVENTION

1. Field of the Invention

The present invention relates to a reflective sensor for detecting the presence or absence of a subject to be detected at a detecting position, a filter used for the reflective sensor, and a method of detecting a subject to be detected using the filter.

2. Description of Related Art

There has been known a reflective sensor, including a light-emitting element for emitting light toward a detecting position, and a light-receiving element for receiving light emitted from the light-emitting element and reflected on a subject to be detected (for example, a sheet of paper) present at the detecting position and generating an electrical signal corresponding to a quantity of received light, used to detect the presence or absence of the subject to be detected at the detecting position based on the electrical signal from the light-receiving element.

The reflective sensor of this type has a risk that dust, such as paper particles generated from a sheet of paper as the subject to be detected, goes inside the reflective sensor. When dust goes inside the reflective sensor, the surfaces of the light-emitting element and the light-receiving element are contaminated, and these elements may become unable to emit or receive light in a satisfactory manner, which possibly results in false detection.

In order to eliminate this problem, there is known a reflective sensor that prevents entrance of dust by disposing a flat-shaped light-transmitting filter between the reflective sensor and the detecting position.

This arrangement, however, has a problem that part of light emitted from the light-emitting element is reflected on the surface of the filter to be incident on the light-receiving element, which makes precise detection of the presence or absence of the subject to be detected infeasible.

SUMMARY OF THE INVENTION

It is therefore an object of the invention to provide a reflective sensor capable of detecting a subject to be detected more precisely.

Another object of the invention is to provide a filter for a reflective sensor that enables the reflective sensor to detect a subject to be detected more precisely.

A further object of the invention is to provide a method of detecting a subject to be detected that enables the reflective sensor to detect a subject to be detected more precisely.

A reflective sensor of the invention is used to detect the presence or absence of a subject to be detected at a detecting position. The reflective sensor includes: a sensor portion having a light-emitting element for emitting light at the detecting position, and a light-receiving element for receiving light emitted from the light-emitting element and reflected on the subject to be detected present at the detecting position and generating an electrical signal corresponding to a quantity of received light; and a filter, disposed between the sensor portion and the detecting position and made of a light-transmitting material capable of transmitting light heading to the detecting position from the light-emitting element and light heading to the light-receiving element from the subject to be detected at the detecting position, for preventing intrusion of dust into the sensor portion. A surface of the filter on a side of the sensor portion is formed into a tapered shape having a first inclined plane opposing the light-emitting element, a second inclined plane opposing the light-receiving element, and a ridge portion formed where the first and second inclined planes meet, and the ridge portion extends in between the light-emitting element and the light-receiving element.

According to this arrangement, reflection on the surface of the filter on the sensor portion side occurs on the first and second inclined planes forming a tapered shape. Hence, light emitted from the light-emitting element and reflected on the first and second inclined planes is not incident on the light-receiving element at all or incident in a slightest quantity.

On the other hand, when the subject to be detected is present at the detecting position, light reflected on the subject to be detected is incident on the light-receiving element by passing through the filter. As a consequence, because a quantity of received light at the light-receiving element varies markedly depending on whether the subject to be detected is present or absent, it is possible to detect the presence or absence of the subject to be detected precisely based on an output signal from the light-receiving element.

The subject to be detected referred to in the invention is defined as an article that can reflect light in a quantity sufficient for the light-receiving element to generate a significant electrical signal. Hence, for example, it goes without saying that a sheet of paper presented at the detecting position is deemed as the subject to be detected. Also, in a case where a pattern (for example, a barcode-like pattern) made of a bright color portion, such as white, and a dark color portion, such as black, is formed on a carrier, such as a sheet of paper, and this particular carrier is presented to the detecting position, the bright color portion in the pattern may be deemed as the subject to be detected. In this case, it should be appreciated that processing may be performed so that a state where the bright color portion deemed as the subject to be detected is absent at the detecting position is recognized as a state where the dark color portion is present at the detecting position based on an output signal from the light-receiving element.

A filter for a reflective sensor of the invention is a filter used for a reflective sensor that detects the presence or absence of a subject to be detected at a detecting position, and includes a sensor portion having a light-emitting element for emitting light at the detecting position, and a light-receiving element for receiving light emitted from the light-emitting element and reflected on the subject to be detected present at the detecting position and generating an electrical signal corresponding to a quantity of received light, which is disposed between the sensor portion and the detecting position and thereby prevents intrusion of dust in the sensor portion. This filter is made of a light-transmitting material capable of transmitting light heading to the detecting position from the light-emitting element and light heading to the light-receiving element from the subject to be detected at the detecting position, and a surface thereof on a side of the sensor portion is formed into a tapered shape having a first inclined plane opposing the light-emitting element, a second inclined plane opposing the light-receiving element, and a ridge portion formed where the first and second inclined planes meet.

A method of detecting a subject to be detected of the invention is a method of detecting the presence or absence of the subject to be detected at a detecting position. This method includes: a step of disposing a filter at a position opposing the detecting position, the filter being made of a light-transmitting material capable of transmitting light, a surface of which on a side opposite to the detecting position being made into a tapered shape having first and second inclined planes and a ridge portion formed where the first and second inclined planes meet; a step of irradiating a detection light at the detecting position through the filter from a position opposing the first inclined plane; and a step of detecting reflected light of the detection light reflected on a surface of the subject to be detected through the filter, at a position opposing the second inclined plane.

It is preferable that a surface of the filter on an opposite side to the sensor portion (a surface on the detecting position side) is formed as a flat plane.

Also, it is preferable that each of the first and second inclined planes is inclined to near the sensor portion in a direction to an intermediate position between the light-emitting element and the light-receiving element.

The above and other objects, features, and advantages of the invention will become more apparent from the following description of embodiments with reference to the accompanying drawings.

BRIEF DESCRIPTION OF THE DRAWINGS

FIG. 8 is a view showing a measurement result of arriving energy.

DESCRIPTION OF THE PREFERRED EMBODIMENTS

Figure 1:
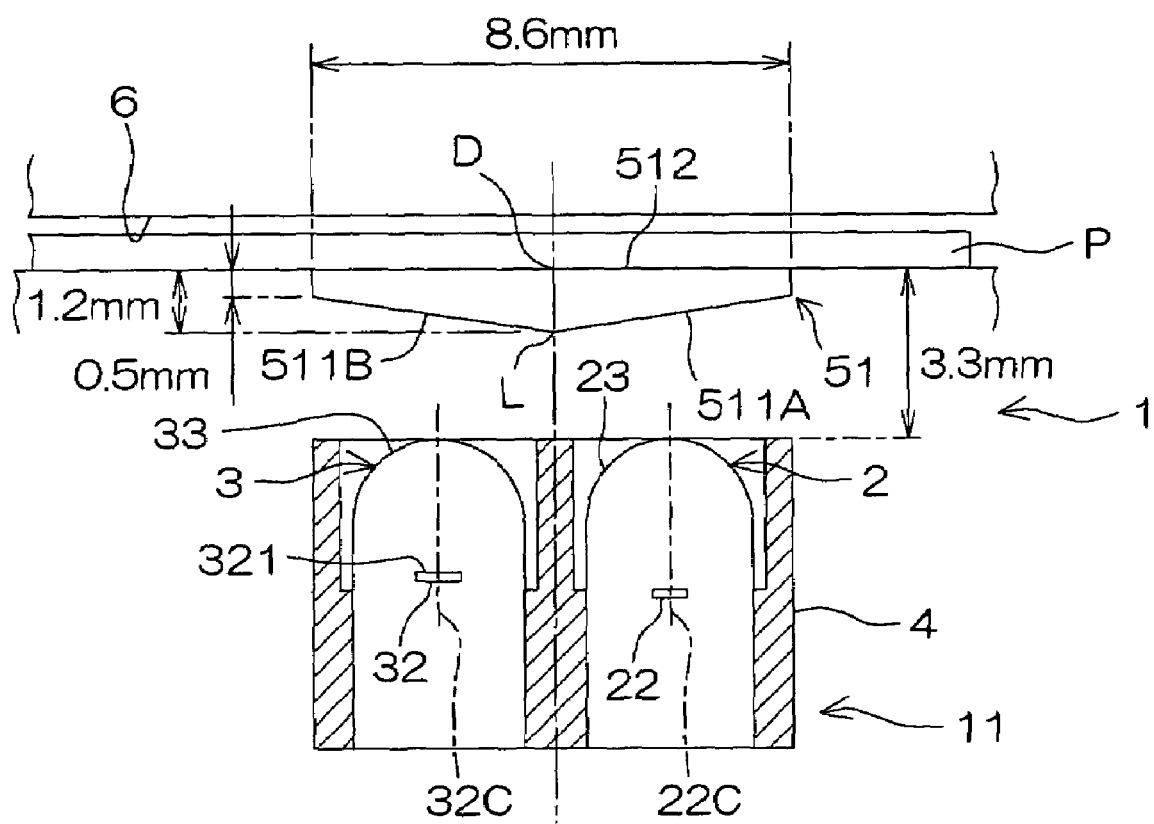
FIG. 1 is a schematic view showing an arrangement of a reflective sensor according to one embodiment of the invention.

FIG. 1 is a schematic view showing an arrangement of a reflective sensor 1 according to one embodiment of the invention. The reflective sensor 1 includes a sensor portion 11 that detects whether a sheet of paper (subject to be detected) P passing through a paper transportation path 6 is present at a detecting position D, and a taper filter 51 that is disposed between the sensor portion 11 and the paper transporting path 6 to prevent intrusion of dust, such as paper particles generated from a sheet of paper, into the sensor portion 11.

The sensor portion 11 includes a light-emitting element 22 that emits light toward the paper transporting path 6 at the detecting position D, and a light-receiving element 32 that receives light emitted from the light-emitting element 22 and reflected on the sheet of paper P present in close proximity to the detecting position D in the paper transporting path 6 on a light-receiving surface 321 and generates an electrical signal corresponding to a quantity of received light. The optical axis 22C of the light-emitting element 22 extends in a direction that intersects at right angles with the paper transporting path 6, and the optical axis 32C of the light-receiving element 32 intersects at right angles with the light-receiving surface 321 and extends in parallel with respect to the optical axis 22C of the light-emitting element 22.

The taper filter 51 is a flat-shaped member made of a light-transmitting material (for example, polycarbonate ($[OC_6H_4C(CH_3)_2C_6H_4OCO]_x$) that can transmit light heading to the paper transportation path 6 from the light-emitting element 22 and reflected light heading to the light-receiving element 32 from the sheet of paper P present in the paper transportation path 6, and is given with a refractive index of 1.586, for example.

The surface of the taper filter 51 on the sensor portion 11 side is formed into a tapered shape such that diminishes toward the sensor portion 11, having, for example, a first inclined plane 511A opposing the light-emitting element 22 and a second inclined plane 511B opposing the light-receiving element 32. Each of the first and second inclined planes 511A and 511B is inclined to near the sensor portion 11 in the direction to an intermediate position between the optical axis 22C of the light-emitting element 22 and the optical axis 32C of the light-receiving element 32, and a ridge portion L is formed where the first and second inclined planes 511A and 511B meet. The ridge portion L passes through a space between the light-emitting element 22 and the light-receiving element 32 when viewed in a plane that looks down the sensor portion 11 from the paper transporting path 6 side, to be more concrete, nearly the intermediate position between the optical axis 22C of the light-emitting element 22 and the optical axis 32C of the light-receiving element 32, and it extends within a plane that is perpendicular to the optical axes 22C and 32C. The ridge portion L divides a line linking the optical axes 22C and 32C into equal halves almost perpendicularly when viewed in a plane.

The surface of the taper filter 51 on the opposite side to the sensor portion 11 (the surface on the detecting position D side) is formed as a flat plane along the paper transportation path 6, and defines a presentation plane 512 that fronts on the paper transportation path 6. The light-emitting element 22 and the light-receiving element 32 are placed side by side in a direction parallel to the presentation plane 512. The central position of the presentation plane 512 is defined as the detecting position D, and in a case where the sheet of paper P is present in close proximity to the detecting position D, light emitted from the light-emitting element 22 is reflected on the sheet of paper P, and the reflected light is incident on the light-receiving surface 321 of the light-receiving element 32.

The taper filter 51 is, for example, formed to have a length in the width direction (a direction parallel to the presentation plane 512 and intersecting at right angles with the ridge portion L) of 8.6 mm (nearly equal to a length of the sensor portion 11 across the light-emitting element 22 and the light-receiving element 32 placed side by side), and a thickness at each end face in the width direction of 0.5 mm. A distance between the presentation plane 512 and the ridge portion L of the taper filter 51, that is, a thickness of the taper filter 51 at the thickest portion is greater than the thickness at each end face in the width direction, and is set to 1.2 mm, for example. The taper filter 51 is disposed in such a manner that, for example, 3.3 mm is given as a distance between the presentation plane 512 and the surface of a casing 4 of the sensor portion 11 on the taper filter 51 side.

A material (refractive index) and a thickness of the taper filter 51, an angle between the first and second inclined planes 511A and 511B, a distance between the optical axes 22C and 32C, and a distance between the taper filter 51 and the sensor portion 11 only have to be set so that light of a sufficient quantity is incident on the light-receiving element 32 when the sheet of paper P is present at the detecting position D and very little light is incident on the light-receiving element 32 when the sheet of paper P is absent at the detecting position D.

The taper filter 51 prevents intrusion of dust into the sensor portion 11, and thereby forestalls an adverse effect that the surfaces of the light-emitting element 22 and the light-receiving element 32 are contaminated with dust, and these elements 22 and 32 may become unable to emit or receive light in a satisfactory manner, which possibly results in false detection.

Figure 2:
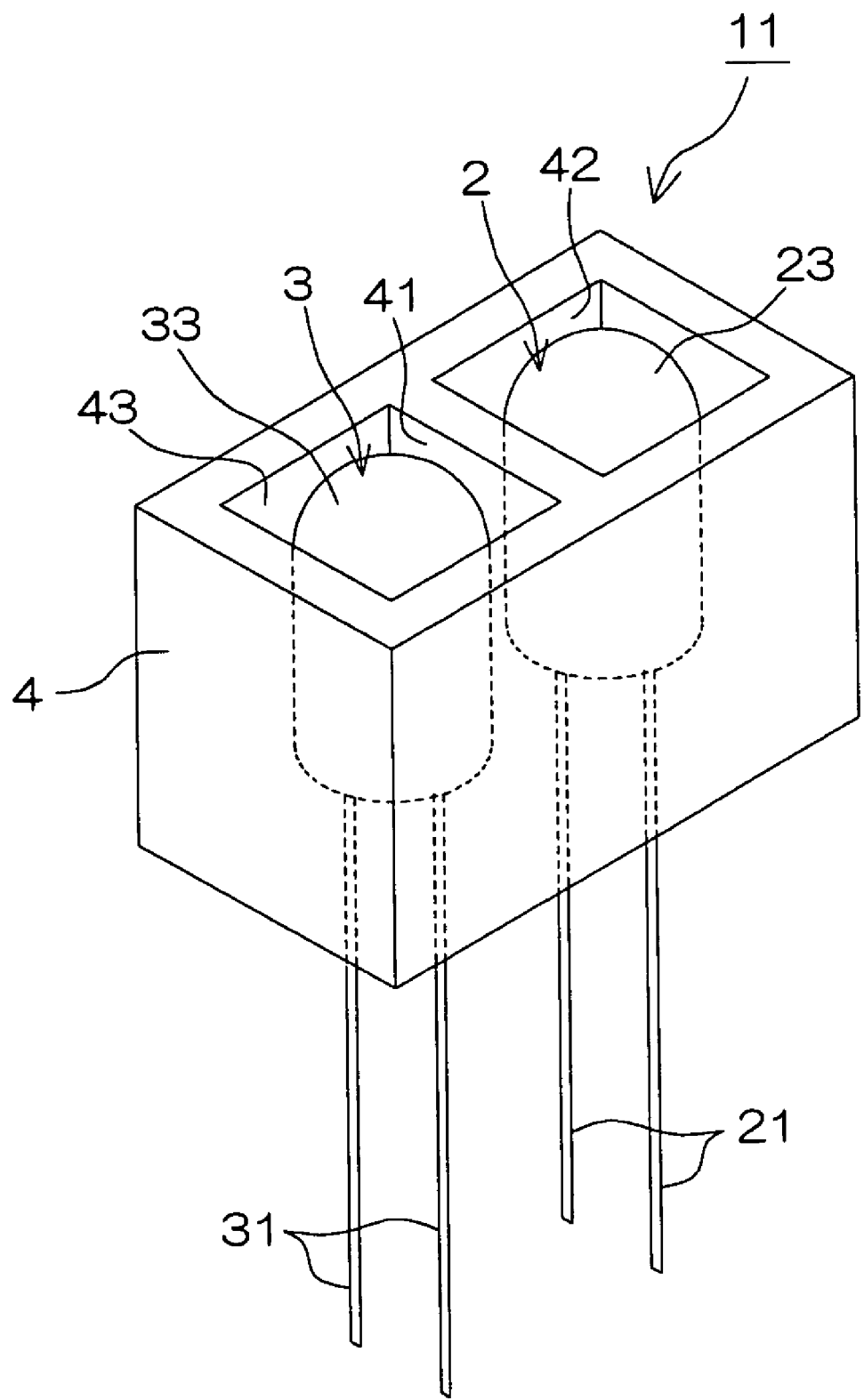
FIG. 2 is a perspective view showing an arrangement of an outward appearance of a sensor portion.

FIG. 2 is a perspective view showing an arrangement of an outward appearance of the sensor portion 11. Referring to FIG. 1 and FIG. 2, the sensor portion 11 includes a light emitter 2 having the light-emitting element 22 and a light receptor 3 having the light-receiving element 32. The light-emitting element 22 is sealed in a molded part of resin that forms a lens 23 having a convex hemispherical surface on the taper filter 51 side. On the other hand, the light-receiving element 32 is sealed in a molded part of resin that forms a lens 33 having a convex hemispherical surface on the taper filter 51 side. The lenses 23 and 33 are made of light-transmitting materials capable of transmitting light emitted from the light-emitting element 22 and light incident on the light-receiving element 32, respectively.

The light emitter 2 and the light receptor 3 are held by the casing 4 shaped like a rectangular box. Inside the casing 4 are defined two accommodating portions 42 and 43 partitioned by a partition 41. The accommodating portions 42 and 43 are defined by rectangular box-shaped spaces capable of accommodating the lens 23 of the light emitter 2 and the lens 33 of the light receptor 3, respectively. By allowing the light emitter 2 and the light receptor 3 to be accommodated in the accommodation portions 42 and 43, respectively, the optical axis 22C of the light-emitting element 22 and the optical axis 32C of the light-receiving element 32 become parallel to each other.

Two connection terminals 21 and two connection terminals 31 are provided to the light emitter 2 and the light receptor 3, respectively. Both the connection terminals 21 and 31 extend in a direction opposite to the taper filter 51, and the light emitter 2 and the light receptor 3 are electrically connected to a power supply apparatus (not shown) through the connection terminals 21 and 31, respectively. An electrical signal from the light-receiving element 32 is given to a control portion (not shown) through the connection terminals 31, and the control portion is able to detect the presence or absence of the subject to be detected based on the electrical signal.

Figure 3:
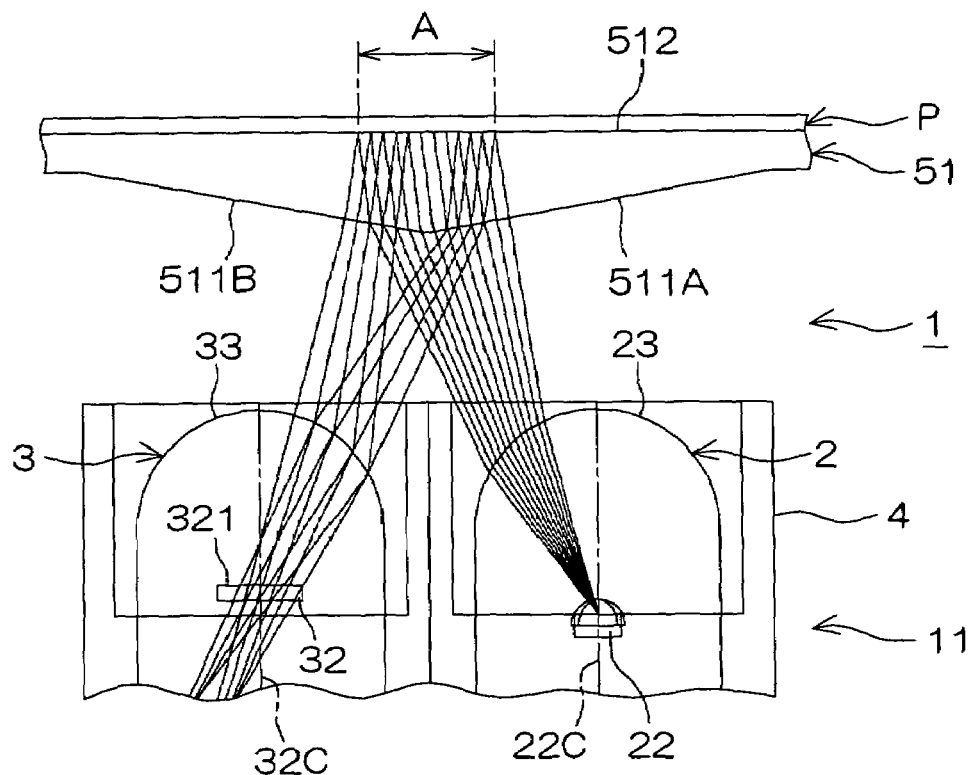
FIG. 3(a) and FIG. 3(b) are views illustrating an optical path of part of light emitted from a light-emitting element.
Figure 3:
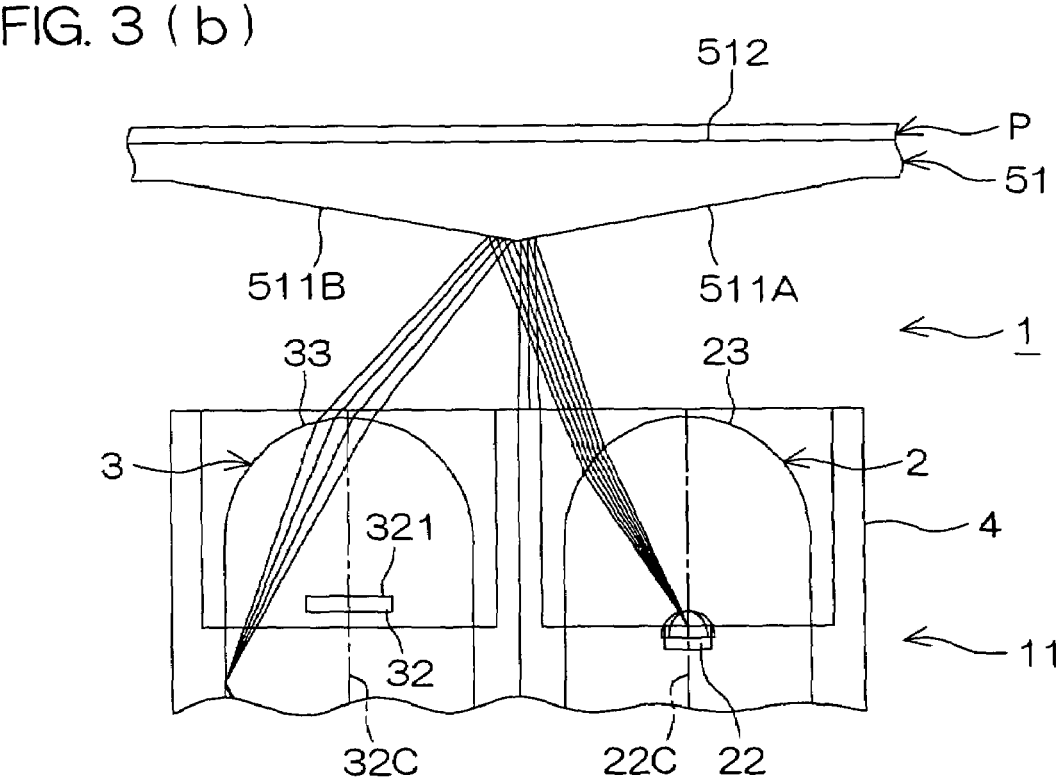

FIG. 3(a) and FIG. 3(b) are views illustrating an optical path of part of light emitted from the light-emitting element 22. FIG. 3(a) shows, of the light emitted from the light-emitting element 22, light that is reflected on the sheet of paper P to be incident on the light-receiving element 32. FIG. 3(b) shows, of the light emitted from the light-emitting element 22 and reflected on the taper filter 51, light that comes in the closest proximity to the light-receiving element 32.

As shown in FIG. 3(a), light emitted from the light-emitting element 22 is refracted when it comes out from the lens 23 of the light emitter 2, and refracted again when it passes through the first and second inclined planes 511A and 511B of the taper filter 51 to be irradiated to the sheet of paper P. A width of an irradiation region (detectable region) A of the sheet of paper P for light incident on the light-receiving element 32 is approximately 1.7 mm. Light reflected on the sheet of paper P is refracted when it passes through the first and second inclined planes 511A and 511B of the taper filter 51, and refracted again when it goes into the lens 33 of the light receptor 3 to be incident on the light-receiving surface 321 of the light-receiving element 32.

As shown in FIG. 3(b), of the light emitted from the light-emitting element 22, light reflected on the taper filter 51 heads to different directions depending on whether it is incident on the first inclined plane 511A or the second inclined plane 511B. To be more specific, light incident on the first inclined plane 511A is reflected toward the sensor portion 11 almost in parallel with respect to the optical axis 22C of the light-emitting element 22 and the optical axis 32C of the light-receiving element 32. On the other hand, light incident on the second inclined plane 511B deviates from the light-receiving surface 321 of the light-receiving element 32 to the side opposite to the light-emitting element 22.

As has been described, in this embodiment, of the light emitted from the light-emitting element 22, light reflected on the taper filter 51 is reflected on the first or second inclined planes 511A and 511B, so that light is prevented from being incident on the light-receiving surface 321 of the light-receiving element 32. Hence, a quantity of received light at the light-receiving element 32 varies noticeably depending on whether the sheet of paper P is present or absent, thereby making it possible to provide a reflective sensor 1 that enables precise detection.

In order to confirm the detecting ability of the reflective sensor 1 of this embodiment, the inventor of the present application measured arriving energy E at the light-receiving surface 321 of the light-receiving element 32 in each of the following cases:

(1) where no filter was disposed;
(2) where a filter shaped like a flat plate (flat-shaped filter) 52 was disposed (see FIG. 5(a) and FIG. 5(b));
(3) where a filter shaped like a capital T (T-shaped filter) 53 was disposed (see FIG. 7(a) and FIG. 7(b)); and
(4) where the taper filter 51 of this embodiment was disposed (see FIG. 3(a) and FIG. 3(b)), in accordance with an equation:

$$E = \{(\text{light-receiving energy})/(\text{light-emitting energy})\} \times 100(\%)$$

where light-emitting energy is energy of light emitted from the light-emitting element 22 and light-receiving energy is energy of light incident on the light-receiving element 32.

Figure 5:
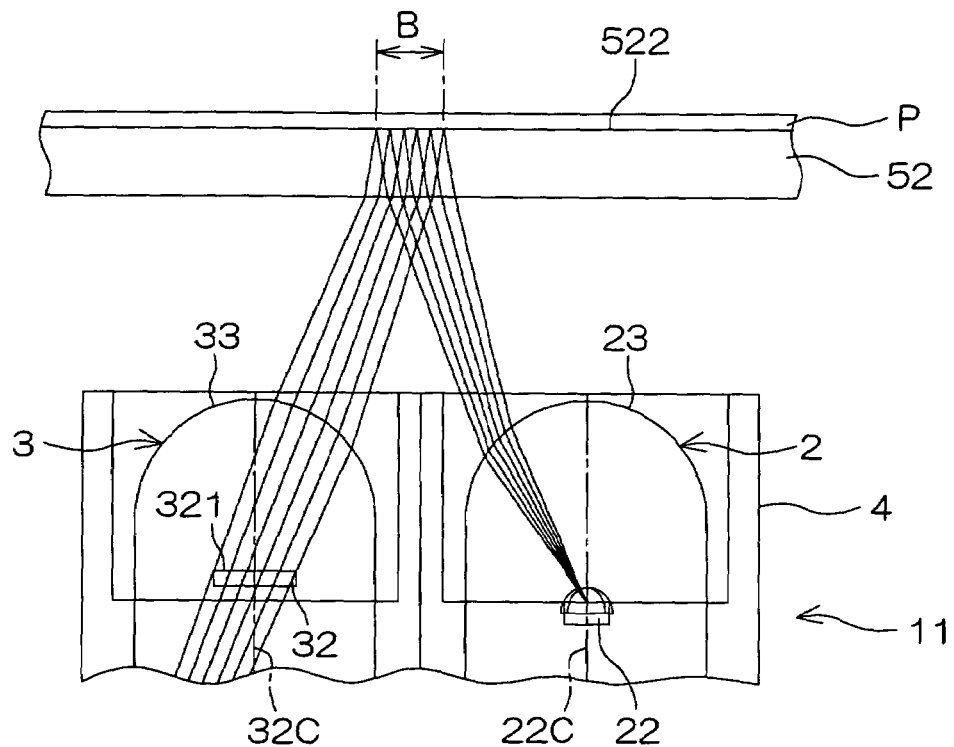
FIG. 5(a) and FIG. 5(b) are views illustrating an optical path of part of light emitted from the light-emitting element.
Figure 5:
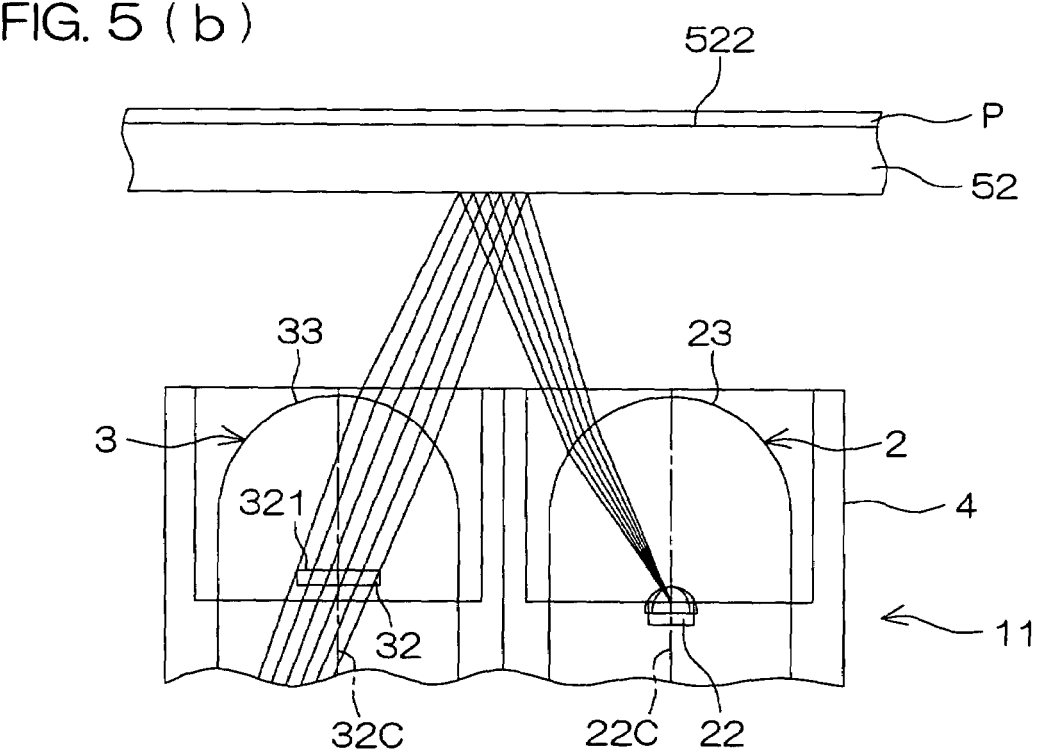
Figure 7:
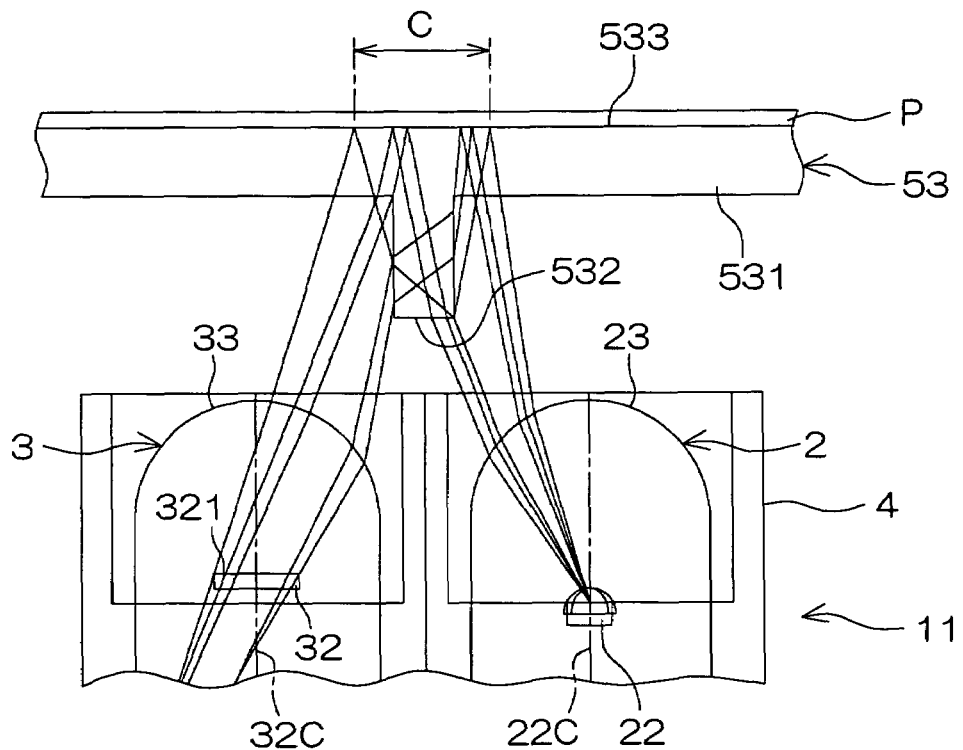
FIG. 7(a) and FIG. 7(b) are views illustrating an optical path of part of light emitted from the light-emitting element.
Figure 7:
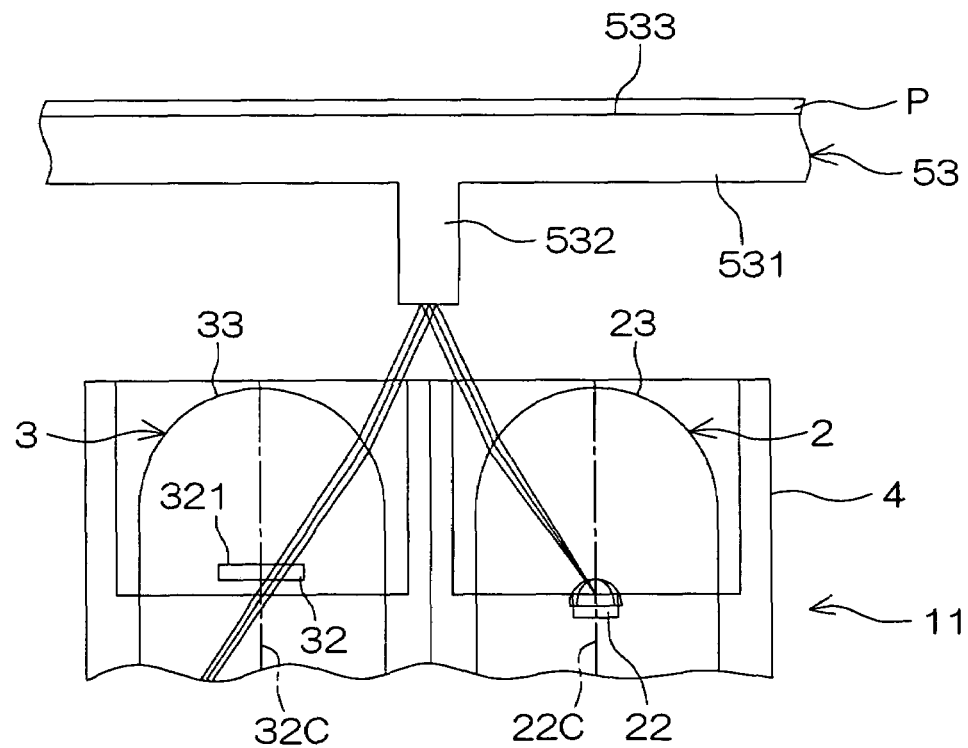

As with the taper filter 51, the flat-shaped filter 52 (FIG. 5(a) and FIG. 5(b)) and the T-shaped filter 53 (FIG. 7(a) and FIG. 7(b)) were made of polycarbonate, and each was given with a refractive index of 1.586.

Figure 4:
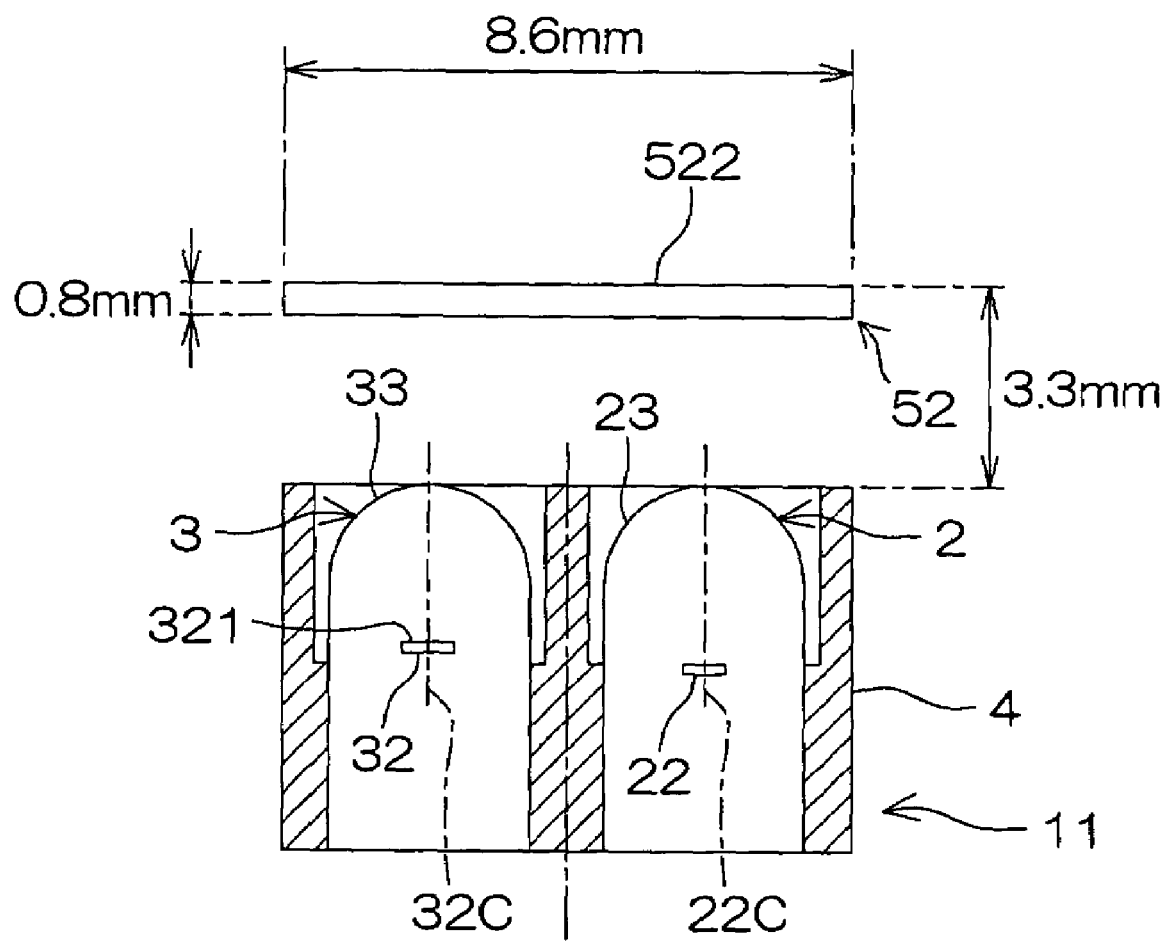
FIG. 4 is a schematic view showing an appearance and an installation mode of a flat-shaped filter.

FIG. 4 is a schematic view showing an arrangement of an outward appearance and an installation mode of the flat-shaped filter 52. Because the arrangement of the sensor portion 11 is the same as described in the embodiment above, like reference numerals are labeled and the description thereof is omitted for ease of explanation.

The flat-shaped filter 52 is formed as a uniform flat plate with a width of 8.6 mm and a thickness of 0.8 mm, for example. The surface of the flat-shaped filter 52 on the opposite side to the sensor portion 11 (the surface on the detecting position side) defines a presentation plane 522 made of a flat plane. The flat-shaped filter 52 is disposed in such a manner that, for example, 3.3 mm is given as a distance between the presentation plane 522 and the surface of the casing 4 of the sensor portion 11 on the flat-shaped filter 52 side. The surface of the flat-shaped filter 52 on the sensor portion 11 side is formed as a flat plane.

FIG. 5(a) and FIG. 5(b) are views illustrating an optical path of part of the light emitted from the light-emitting element 22. FIG. 5(a) shows, of the light emitted from the light-emitting element 22, light that is reflected on the sheet of paper P to be incident on the light-receiving element 32. FIG. 5(b) shows, of the light emitted from the light-emitting element 22, light that is reflected on the surface of the flat-shaped filter 52 on the sensor portion 11 side to be incident on the light-receiving element 32.

As shown in FIG. 5(a), light emitted from the light-emitting element 22 is refracted when it comes out from the lens 23 of the light emitter 2, and refracted again when it passes through the surface of the flat-shaped filter 52 on the sensor portion 11 side to be irradiated to the sheet of paper P. A width of a detectable region B is approximately 0.85 mm. Light reflected on the sheet of paper P is refracted when it passes through the surface of the flat-shaped filter 52 on the sensor portion 11 side, and refracted again when it goes into the lens 33 of the light receptor 3 to be incident on the light-receiving surface 321 of the light-receiving element 32.

Comparison between FIG. 3(a) and FIG. 5(a) reveals that the width of the detectable region A of the taper filter 51 is longer than the width of the detectable region B of the flat-shaped filter 52, and therefore a quantity of light incident on the light-receiving surface 321 of the light-receiving element 32 is greater in the case of the taper filter 51 than in the case of the flat-shaped filter 52.

As shown in FIG. 5(b), of the light emitted from the light-emitting element 22, light reflected on the flat-shaped filter 52 is refracted when it subsequently goes into the lens 33 of the light receptor 3 to be incident on the light-receiving surface 321 of the light-receiving element 32.

Hence, compared with the case of using the taper filter 51, in the case of using the flat-shaped filter 52, a quantity of received light at the light-emitting element 32 is smaller in the presence of the sheet of paper P and the light-receiving element 32 receives a considerable quantity of light even in the absence of the sheet of paper P. A quantity of received light thus varies less whether the sheet of paper P is present or absent, which makes precise detection almost infeasible.

Figure 6:
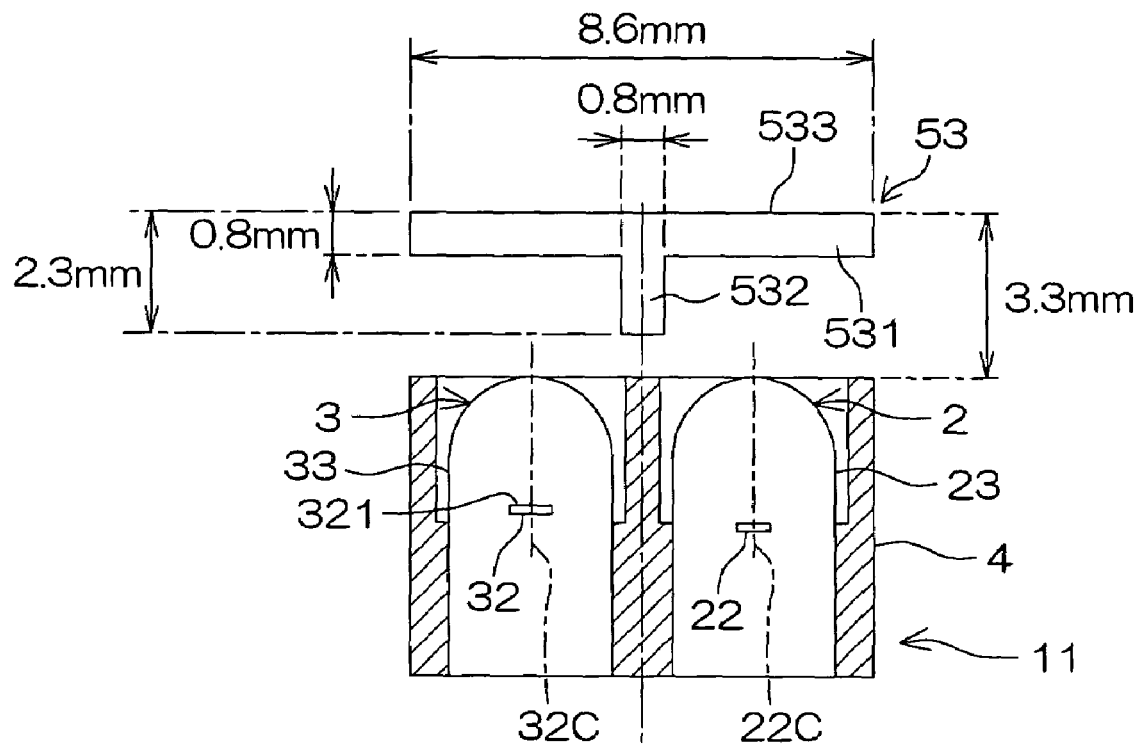
FIG. 6 is a schematic view showing an appearance and an installation mode of a T-shaped filter.

FIG. 6 is a schematic view showing an outward appearance and an installation mode of the T-shaped filter 53. Because the arrangement of the sensor portion 11 is the same as described in the embodiment above, like reference numerals are labeled and the description thereof is omitted for ease of explanation.

The T-shaped filter 53 includes a uniform flat plate portion 531 formed to have a width of 8.6 mm and a thickness of 0.8 mm, for example, and a protruding wall portion 532 protruding vertically toward the sensor portion 11 from the flat plate portion 531 at the center position in the width direction. The protruding wall portion 532 extends in the shape of a wall by passing through nearly the center position between the optical axis 22C of the light-emitting element 22 and the optical axis 32C of the light-receiving element 32. The surface of the flat plate portion 531 on the opposite side to the sensor portion 11 defines a presentation plane 533 made of a flat plane. The protruding wall portion 532 is formed to have a width (thickness) of 0.8 mm, for example, and a height of 2.3 mm, for example, is given as a height from the tip end surface of the protruding wall portion 532 on the sensor portion 11 side to the presentation plane 533. The T-shaped filter 53 is disposed in such a manner that 3.3 mm is given as a distance between the presentation plane 533 and the surface of the casing 4 of the sensor portion 11 on the T-shaped filter 53 side.

FIG. 7(a) and FIG. 7(b) are views illustrating an optical path of part of light emitted from the light-emitting element 22. FIG. 7(a) shows, of the light emitted from the light-emitting element 22, light that is reflected on the sheet of paper P to be incident on the light-receiving element 32. FIG. 7(b) shows, of the light emitted from the light-emitting element 22, light that is reflected on the surface of the T-shaped filter 53 on the sensor portion 11 side to be incident on the light-receiving element 32.

As shown in FIG. 7(a), light emitted from the light-emitting element 22 is refracted when it comes out from the lens 23 of the light emitter 2, and refracted again when it passes through the surface of the T-shaped filter 53 on the sensor portion 11 side (the surface of the flat plate portion 531 on the sensor portion 11 side and the surface of the protruding wall portion 532 on the sensor portion 11 side) to be irradiated to the sheet of paper P. A width of a detectable region C is approximately 1.73 mm. Light reflected on the sheet of paper P is refracted when it passes through the surface of the T-shaped filter 53 on the sensor portion 11 side (the surface of the flat plate portion 531 on the sensor portion 11 side and the both end faces of the protruding wall portion 532 in the width direction), and refracted again when it goes into the lens 33 of the light receptor 3 to be incident on the light-receiving surface 321 of the light-receiving element 32.

In the case of the T-shaped filter 53, light is not incident on the center portion of the detectable region C in the width direction. Hence, a quantity of light incident on the light-receiving surface 321 is smaller than in the case of the flat-shaped filter 52 shown in FIG. 5(a).

As shown in FIG. 7(b), of the light emitted from the light-emitting element 22, light reflected on the surface of the T-shaped filter 53 on the sensor portion 11 side (the surface of the protruding wall portion 532 on the sensor portion 11 side) is refracted when it subsequently goes into the lens 33 of the light receptor 3 to be incident on the light-receiving surface 321 of the light-receiving element 32.

In the case of the T-shaped filter 53, light reflected on the surface of the T-shaped filter 53 on the sensor portion 11 side is not incident on the light-receiving surface 321 of the light-receiving element 32 from the center in the width direction to the opposite side to light-emitting element 22. This is because, of the light emitted from the light-emitting element 22, light passing a portion closer to the light emitter 2 than the protruding wall portion 532 is blocked by the protruding wall portion 532 and is not incident on the light receptor 3 side. Hence, a quantity of light incident on the light-receiving surface 321 is smaller than in the case of the flat-shaped filter 52 shown in FIG. 5(b). This may slightly improve the detecting ability in comparison with the case of using the flat-shaped filter 52. However, a difference in quantity of received light depending on whether the sheet of paper P is present or absent is far smaller than in the case of using the taper filter 51.

The measurement result of the arriving energy E is set forth in FIG. 8, which shows the arriving energy E in the cases (i) where the subject to be detected was white paper (reflectance=1), (ii) where the subject to be detected was black paper (reflectance=0.11), and (iii) where the subject to be detected was not at the detecting position (in the absence of the subject to be detected), in addition to a ratio (R1) of the arriving energy in a case where the subject to be detected was white paper and the arriving energy in the absence of the subject to be detected, and a ratio (R2) of the arriving energy in a case where the subject to be detected was white paper and the arriving energy in a case where the subject to be detected was black paper.

In the case of using the flat-shaped filter 52, the arriving energy E in the absence of the subject to be detected was 0.07018%. On the contrary, in the case of using the T-shaped filter 53, the arriving energy E in the absence of the subject to be detected was 0.05356%. It is thus understood that a quantity of received light reflected on the surface of the filter on the sensor portion 11 side is smaller in the case of using the T-shaped filter 53 than in the case of using the flat-shaped filter 52.

On the other hand, the arriving energy E (=0.50186%) when the subject to be detected was white paper and the arriving energy E (=0.09573%) when the subject to be detected was black paper in the case of using the T-shaped filter 53 are smaller than the arriving energy E (=0.68561%) when the subject to be detected was white paper and the arriving energy E (=0.13082%) when the subject to be detected was black paper in the case of using the flat-shaped filter 52. It is thus understood that a quantity of received light reflected on the subject to be detected is smaller in the case of using the T-shaped filter 53 than in the case of using the flat-shaped filter 52. Consequently, the value (=9.37) of R1 in the case of using the T-shaped filter 53 is smaller than the value (=9.77) of R1 in the case of using the flat-shaped filter 52. Hence, although a quantity of received light reflected on the surface of the filter on the sensor portion 11 side is small, the detecting ability of the T-shaped filter 53 is by no means excellent.

On the contrary, in the case of using the taper filter 51, the arriving energy E in the absence of the subject to be detected was 0.06353%, and it is understood that a quantity of received light reflected on the surface of the filter on the sensor portion 11 side is smaller in the case of using the taper filter 51 than in the case of using the flat-shaped filter 52 (E=0.07018%).

Also, the arriving energy E (=1.23540%) when the subject to be detected was white paper and the arriving energy E (=0.18539%) when the subject to be detected was black paper in the case of using the taper filter 51 are greater than the arriving energy E (=0.68561%) when the subject to be detected was white paper and the arriving energy E (=0.13082%) when the subject to be detected was black paper in the case of using the flat-shaped filter 52. It is thus understood that a quantity of received light reflected on the subject to be detected is far greater in the case of using the taper filter 51 than in the case of using the flat-shaped filter 52. Consequently, the value (=19.45) of R1 in the case of using the taper filter 51 is nearly two times greater than the value (=9.77) of R1 in the case of using the flat-shaped filter 52.

From the foregoing measuring result, it can be said that in the case of using the taper filter 51, a quantity of received light at the light-receiving element 32 of the light reflected on the filter can be reduced, and a quantity of light reflected on the subject to be detected can be increased markedly. Hence, the reflective sensor 1 employing the taper filter 51 out of the three kinds of filters (the flat-shaped filter 52, the T-shaped filter 53, and the taper filter 51) achieves the highest detecting ability.

In the case of using the taper filter 51, the value of R1 becomes approximately two times greater than the value in the case of using the flat-shaped filter 52, which offers an advantage that an output of the reflective sensor 1 does not have to be adjusted using a variable resistor or the like.

The outside dimensions, a material, a refractive index of the taper filter 51, a distance between the taper filter 51 and the sensor portion 11, etc. are not limited to the numerical values specified as above. For example, they may be changed depending on a distance between the light-emitting element 22 and the light-receiving element 32, curvatures of the lenses 23 and 33 of the light emitter 2 and the light receptor 3, etc.

The entire surface of the taper filter 51 on the sensor portion 11 side does not have to be composed of the inclined planes 511A and 511B, and only part thereof (for example, at the center portion in the width direction) may be formed as an inclined plane.

The embodiment above describes an arrangement to detect whether the sheet of paper P transported along the paper transportation path 6 is present at the detecting position. It should be appreciated, however, that the reflective sensor 1 can be used for the purpose of detecting a document size at a document presentation portion in a copying machine, for example.

Also, the embodiment above describes a case where the presence or absence of the sheet of paper P at the detecting position is detected. It should be appreciated, however, that the reflective sensor 1 can be used to detect a black-and-white pattern formed on a sheet of paper.

While the above description describes embodiments of the invention in detail, it should be appreciated that the embodiments represent examples to provide clear understanding of the technical contents of the invention, and the invention is not limited to such examples. The sprit and the scope of the invention, therefore, are limited solely by the scope of the appended claims.

This application is based on Application No. 2002-197453 filed with the Japanese Patent Office on Jul. 5, 2002, the entire content of which is incorporated hereinto by reference.

What is claimed is:

1. A reflective sensor used to detect presence or absence of a subject to be detected at a detecting position, the reflective sensor comprising:
    a sensor portion having a light-emitting element for emitting light toward the detecting position, and a light-receiving element for receiving light emitted from the light-emitting element and reflected on the subject to be detected present at the detecting position and generating an electrical signal corresponding to a quantity of received light; and
    a filter, disposed between the sensor portion and the detecting position and made of a light-transmitting material capable of transmitting light heading to the detecting position from the light-emitting element and light heading to the light-receiving element from the subject to be detected at the detecting position, for preventing intrusion of dust into the sensor portion,
    wherein a surface of the filter on a side of the sensor portion is formed into a tapered shape having a first inclined plane opposing the light-emitting element, a second inclined plane opposing the light-receiving element, and a ridge portion formed where the first and second inclined planes meet, the ridge portion extending in a space between the light-emitting element and the light-receiving element.

2. The reflective sensor according to claim 1, wherein a surface of the filter on an opposite side to the sensor portion is formed as a flat plane.

3. The reflective sensor according to claim 1, wherein each of the first and second inclined planes is inclined to near the sensor portion in a direction to an intermediate position between the light-emitting element and the light-receiving element.

4. A filter for a reflective sensor used for a reflective sensor that detects presence or absence of a subject to be detected at a detecting position and includes a sensor portion having a light-emitting element for emitting light toward the detecting position, and a light-receiving element for receiving light emitted from the light-emitting element and reflected on the subject to be detected present at the detecting position and generating an electrical signal corresponding to a quantity of received light, the filter being disposed between the sensor portion and the detecting position and thereby preventing intrusion of dust in the sensor portion, wherein:

the filter is made of a light-transmitting material capable of transmitting light heading to the detecting position from the light-emitting element and light heading to the light-receiving element from the subject to be detected at the detecting position; and a surface of the filter on a side of the sensor portion is formed into a tapered shape having a first inclined plane opposing the light-emitting element, a second inclined plane opposing the light-receiving element, and a ridge portion formed where the first and second inclined planes meet.

5. The filter for a reflective sensor according to claim 4, wherein a surface of the filter on an opposite side to the sensor portion is formed as a flat plane.

6. The filter for a reflective sensor according to claim 4, wherein each of the first and second inclined planes is inclined to near the sensor portion in a direction to an intermediate position between the light-emitting element and the light-receiving element.

7. A method of detecting presence or absence of a subject to be detected at a detecting position, the method comprising:

a step of disposing a filter at a position opposing the detecting position, the filter being made of a light-transmitting material capable of transmitting light, a surface of which on a side opposite to the detecting position being made into a tapered shape having first and second inclined planes and a ridge portion formed where the first and second inclined planes meet;

a step of irradiating detection light at the detecting position through the filter from a position opposing the first inclined plane; and a step of detecting reflected light of the detection light reflected on a surface of the subject to be detected through the filter, at a position opposing the second inclined plane.

* * * * *